United States Patent
Hu et al.

(10) Patent No.: US 9,538,543 B2
(45) Date of Patent: Jan. 3, 2017

(54) INTERFERENCE INDICATOR FOR WIRELESS COMMUNICATION SYSTEMS

(75) Inventors: Teck Hu, Melbourne, FL (US); Jiyong Pang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 273 days.

(21) Appl. No.: 14/386,652

(22) PCT Filed: Mar. 19, 2012

(86) PCT No.: PCT/CN2012/072553
§ 371 (c)(1),
(2), (4) Date: Feb. 10, 2015

(87) PCT Pub. No.: WO2013/138986
PCT Pub. Date: Sep. 26, 2013

(65) Prior Publication Data
US 2015/0189664 A1    Jul. 2, 2015

(51) Int. Cl.
*H04W 72/08* (2009.01)
*H04W 92/20* (2009.01)

(52) U.S. Cl.
CPC ........... *H04W 72/082* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2011/0280166 A1 | 11/2011 | Nien et al. | |
| 2011/0310830 A1* | 12/2011 | Wu | H04W 72/1289 370/329 |
| 2012/0236736 A1* | 9/2012 | Frank | H04W 24/04 370/252 |

FOREIGN PATENT DOCUMENTS

| | | |
|---|---|---|
| CN | 101515822 A | 8/2009 |
| CN | 102026209 A | 4/2011 |
| CN | 102186247 A | 9/2011 |
| CN | 102215534 A | 10/2011 |
| TW | 201203970 A1 | 1/2012 |

OTHER PUBLICATIONS

Partial English Translation of Ming et al. (CN 102215534). Paragraphs 6-58 and Figs. 1-6.*

(Continued)

*Primary Examiner* — Hassan Kizou
*Assistant Examiner* — Ashil Farahmand
(74) *Attorney, Agent, or Firm* — Fay Sharpe, LLP

(57) ABSTRACT

Methods and apparatuses for indicating an interference distribution in frame between base stations are provided. The method comprises: in response to a mismatch between a first frame allocation used by a first base station and a second frame allocation used by a second base station, transmitting, from the first base station to the second base station, a message for indicating an interference distribution in frame, A new information element, i.e., UL ABS (uplink Almost Blank Subframe) is introduced to indicate the uplink ABS information of the interfering base station. A modified DL ABS with a flag is used to indicate the downlink ABS information of the interfering base station, wherein the flag is to indicate that the DL ABS is used to protect UL transmission in the recipient base station.

12 Claims, 4 Drawing Sheets

(56) References Cited

OTHER PUBLICATIONS

Partial English Translation of Zhiping et al. (CN 102186247). Paragraphs 32-64 and Figs. 1-6.*
International Search Report for PCT/CN2012/072553 dated Jan. 3, 2013.

* cited by examiner

| Configuration | DL:UL Ratio | Switch-point Periodicity | Subframe Number | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 1:3 | 5 ms | D | S | U | U | U | D | S | U | U | U |
| 1 | 1:1 | 5 ms | D | S | U | U | D | D | S | U | U | D |
| 2 | 3:1 | 5 ms | D | S | U | D | D | D | S | U | D | D |
| 3 | 2:1 | 10 ms | D | S | U | U | U | D | D | D | D | D |
| 4 | 7:2 | 10 ms | D | S | U | U | D | D | D | D | D | D |
| 5 | 8:1 | 10 ms | D | S | U | D | D | D | D | D | D | D |
| 6 | 3:5 | 10 ms | D | S | U | U | U | D | S | U | U | D |

INTERFERENCE INDICATOR FOR WIRELESS COMMUNICATION SYSTEMS

FIELD OF THE INVENTION

Embodiments of the present invention generally relates to communication systems, and more particularly to a method, a system, an apparatus, a base station, and a computer program for indicating interference for wireless communication systems.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

The abbreviations and terms appearing in the description and drawings are defined as below.
3GPP Third Generation Partnership Project
ABS Almost Blank Subframe
BS Base Station
DL Downlink
eNB E-UTRAN NodeB, Base Station in E-UTRAN
E-UTRAN Evolved UTRAN
FDD Frequency Division Duplex
IE Information Element
LTE-A Long Term Evolution-Advanced
TDD Time Division Duplex
UE User Equipment
UL Uplink Wireless communication systems include a network of devices for providing wireless connectivity to wireless-enabled devices including mobile units, smart phones, tablet devices, laptops, desktops, and other types of user equipment. The network access devices include base stations, base station routers, access points, e-node-Bs (eNBs), and the like. The entities within the wireless communication system generally conform to standards and/or protocols that facilitate communication over the air interface. For example, wireless communication systems are currently being developed that operate according to the Long Term Evolution (LTE) standards and/or protocols defined by the Third Generation Partnership Project (3GPP, 3GPP2). The LTE-Advanced standard supports both frequency division duplexing (FDD) and time division duplexing (TDD). Service providers are expected to implement both types of systems depending on the circumstances of the deployment scenario. The advantages to deploying a TDD system include efficient use of the radio spectrum because TDD uses a single frequency resource and does not require the paired set of frequency resources used to implement FDD.

FIG. 1 shows the FDD frame structure and the TDD frame structure defined in LTE system. As shown in FIG. 1, one radio frame has an overall length of 10 ms.

In FDD frame structure, the frame is divided into a total of 10 subframes, each having a length of 1 ms. The uplink (UL) subframes and the downlink (DL) subframes are transmitted on different frequencies $f_{UL}$ and $f_{DL}$.

In TDD frame structure, the 10 ms frame comprises two half frames, each 5 ms long. Each half frame is further split into five subframes, each 1 ms long. The subframes may be divided into UL transmission subframe, DL transmission subframe, and special subframe. The special subframes consist of three fields: Downlink Pilot Time Slot (DwPTS), Guard Period (GP), and Uplink Pilot Time Slot (UpPTS).

One of the advantages of using LTE TDD is that it is possible to dynamically change the uplink and downlink ratio and characteristics to meet various load conditions. Motivated by TDD spectrum operator desire to better control interference from co-channel deployments and for traffic adaptation, in LTE-A, the use of dynamic reconfiguration of TDD frame allocation is currently being considered for possible standardization in Release 11.

However, interference between neighbour base stations and/or user equipments may arise due to the dynamic reconfiguration of TDD frame allocation in neighbour base stations. For example, base-station-to-base-station (BS-to-BS) interference occurs when one base station transmits a downlink signal to a user equipment in a subframe while a neighbour base station is attempting to receive an uplink signal from other user equipment during the same subframe. For another example, user-equipment-to-user-equipment (UE-to-UE) interference occurs when one or more user equipment are transmitting uplink signals to a base station in a subframe while other user equipments are trying to receive downlink signals from another base station during the same subframe.

Generally speaking, the UE-to-UE or BS-to-BS interference may occur when different uplink and downlink frame allocations are used in neighbour cells, for example, when these neighbour cells are from different operators, or the neighbour cells belong to different network (e.g., one is LTE-FDD, the other is LTE-TDD). The UE-to-UE or BS-to-BS interference may also occur in future systems, e.g., device to device communication system.

SUMMARY OF THE INVENTION

It is known that Almost Blank Subframes (ABS) may be used to avoid or mitigate conventional downlink Base-Station-to-User-Equipment (BS-to-UE) interference. Inventors have found that ABS may also be used to mitigate the interference of BS-to-BS and UE-to-UE.

Therefore, when ABS is used to mitigate the interference of BS-to-BS or UE-to-UE, it would be desirable in the art to provide a mechanism to indicate an interference distribution in frame between network elements (e.g., base stations). The interference distribution may be uplink or downlink ABS distribution in the interfering base station. In this way, the recipient base station (i.e., the interfered base station) could optimize its scheduling based on the information about the interference distribution.

To better address one or more of the above concerns, in a first aspect of the invention, a method is provided. The method comprises: in response to a mismatch between a first frame allocation used by a first base station and a second frame allocation used by a second base station, transmitting, from the first base station to the second base station, a message for indicating an interference distribution in frame.

In some embodiments, the interference distribution is Almost Blank Subframe (ABS) distribution being configured by the first base station.

In one embodiment, if the mismatch is between uplink subframes of the first frame allocation and downlink subframes of the second frame allocation, the message includes uplink ABS information.

In another embodiment, if the mismatch is between downlink subframes of the first frame allocation and uplink subframes of the second frame allocation, the message includes downlink ABS information. In a further embodiment, the message may further comprise a flag to indicate that the downlink ABS is used to protect uplink transmission in the second base station.

In a second aspect of the invention, a method is provided. The method comprises: receiving, from a first base station at a second base station, a message for indicating an interference distribution in frame, wherein the message implies a mismatch between a first frame allocation used by the first base station and a second frame allocation used by the second base station.

In some embodiments, the interference distribution is Almost Blank Subframe (ABS) distribution being configured by the first base station.

In one embodiment, the second base station may schedule downlink transmission according to uplink ABS information included in the message.

In another embodiment, the second base station may schedule uplink transmission according to downlink ABS information and a flag included in the message, wherein the flag indicates that the downlink ABS is used to protect the uplink transmission in the second base station.

In further embodiments, if the second base station determines that the first frame allocation and the second frame allocation are the same, the second base station would request the first frame allocation from the first base station or inform the second frame allocation to the first base station.

In a third aspect of the invention, an apparatus is provided to implement various embodiments of the method of the first aspect of the invention. The apparatus may comprise a transmitter configured to, in response to a mismatch between a first frame allocation used by a first base station and a second frame allocation used by a second base station, transmit from the first base station to the second base station, a message for indicating an interference distribution in frame.

The apparatus may further comprise a scheduler configured to schedule, at the first base station, uplink transmission of its interfering user equipment according to uplink ABS information included in the message.

In a fourth aspect of the invention, an apparatus is provided to implement various embodiments of the method of the second aspect of the invention. The apparatus may comprise a receiver configured to, from a first base station at a second base station, a message for indicating an interference distribution in frame, wherein the message implies a mismatch between a first frame allocation used by the first base station and a second frame allocation used by the second base station.

The apparatus may further comprise a scheduler configured to schedule downlink transmission according to uplink ABS information included in the message. The scheduler may be further configured to schedule uplink transmission according to downlink ABS information and a flag included in the message.

The apparatus may farther comprise a transmitter configured to transmit a request for the first frame allocation to the first base station or inform the second frame allocation to the first base station, if the second base station determines that the first frame allocation and the second frame allocation are the same.

In a fifth aspect of the invention, an apparatus is provided, which comprises at least one processor and at least one memory including computer program code. The memory and the computer program code are configured to cause the apparatus to perform embodiments of the method of the first aspect of the invention or embodiments of the method of the second aspect of the invention.

In a sixth aspect of the invention, a computer program product is provided, which, comprises at least one computer readable storage medium having a computer readable program code portion stored thereon. The computer readable program code portion comprises program code instructions for perform embodiments of the method of the first aspect of the invention or embodiments of the method of the second aspect of the invention.

Particular embodiments of the subject matter described in this specification can be implemented so as to realize one or more of the following advantages.

With particular embodiments of the techniques described in this specification, an interference distribution (for example, ABS pattern) in frame being configured in a first base station (i.e., the interfering BS) may be informed to a second base station (i.e., the interfered BS). Thus, the recipient base station (i.e., the interfered base station) could optimize its scheduling based on the information about the interference distribution.

Embodiments of the invention may be applied to various homogeneous network or heterogeneous network where the UE-to-UE or BS-to-BS interference may occur.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Figures 1, 2:
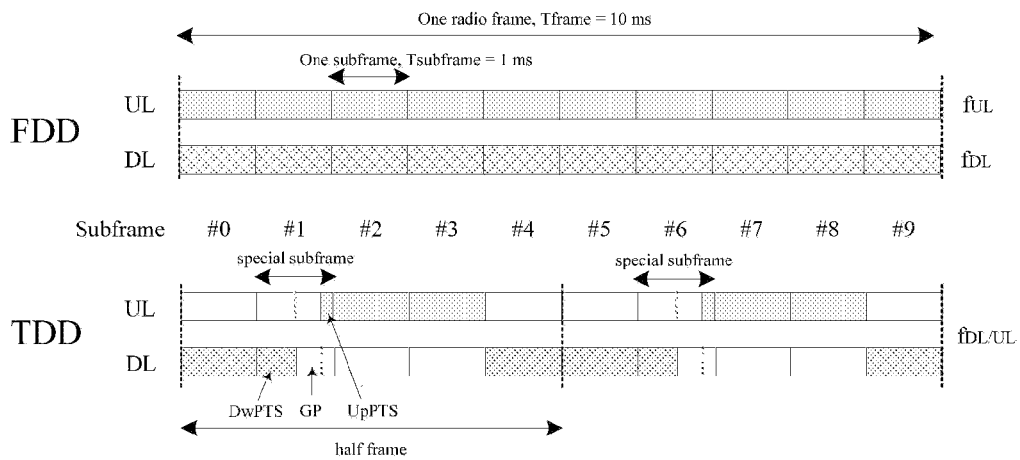
FIG. 1 illustrates the FDD frame structure and the TDD frame structure defined in LTE system.
FIG. 2 illustrates one exemplary set of uplink/downlink subframe allocations in TDD system.

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As previously mentioned, embodiments of the invention may be applied to various homogeneous network or heterogeneous network where the UE-to-UE or BS-to-BS interference may occur. For illustration, in the following description, a wireless communication system that operates according to Time Division Duplex (TDD) is given as an example to detail the exemplary embodiments of the present invention. For example, LTE-A allow different cells, BSs, or eNBs to select different allocations of the subframes to uplink and downlink transmission. As mentioned above, it is possible to dynamically change the TDD frame allocation to meet varying load conditions. In order that, a number of standard configurations have been set within the LTE standards.

FIG. 2 illustrates one exemplary set of uplink/downlink subframe allocations in TDD system. As shown in FIG. 2, a total of seven up/downlink configurations have been set, and these use either 5 ms or 10 ms switch-point periodicities. In these configurations, different ratios of downlink-to-uplink resources are available for different load conditions. In the subframes shown in FIG. 2, D is a subframe for downlink transmission, S is a "special" subframe used for a guard time, and U is a subframe for uplink transmission. However, skilled in the art should appreciate that the allocations indicated in FIG. 2 are intended to be exemplary and alternative sets of predetermined allocations may also be used.

Base stations or eNBs in the TDD system may dynamically reconfigure its TDD frame allocation on uplink and downlink transmission, for example, according to the subframe configurations as illustrated in FIG. 2. However, interference between neighbour base stations and/or user equipments may arise due to the dynamic reconfiguration of TDD frame allocation in the neighbour base stations.

Figure 3:
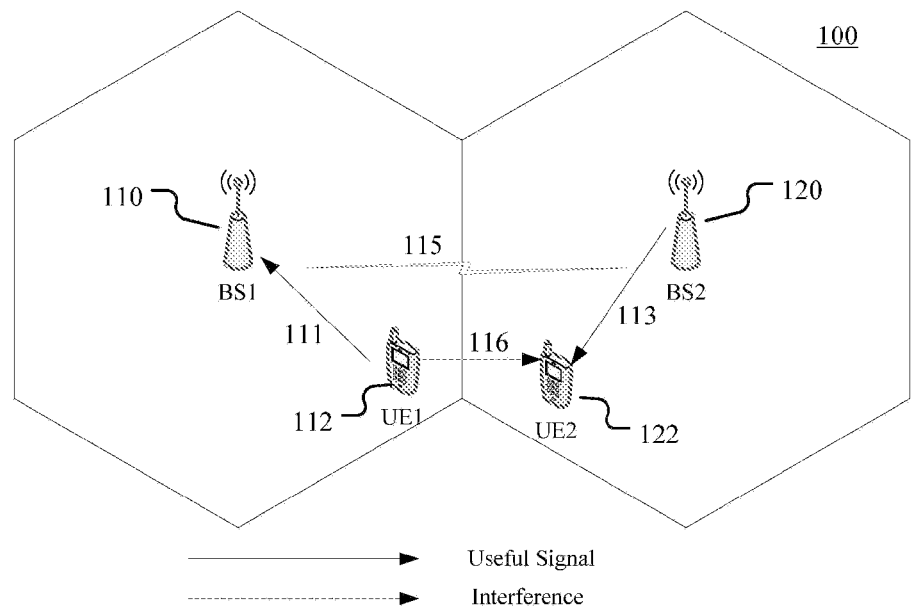
FIG. 3 illustrates an exemplary scenario 1 where the UE-to-UE interference occurs.

FIG. 3 illustrates an exemplary scenario 1 where the UE-to-UE interference occurs. In the illustrated scenario 1, a wireless communication system 100 is shown, which includes two neighbour base stations, BS1 110 and BS2 120. BS1 110 and BS2 120 could provide wireless connectivity using TDD standards and/or protocols. For example, BS1 110 and BS2 120 may operate according to the LTE-Advanced standards and/or protocols established by 3GPP. However, persons of ordinary skill in the art having benefit of the present disclosure should appreciate that BS1 110 and BS2 120 may alternatively operate according to different standards and/or protocols that support time division duplex over the air interface.

In the illustrated scenario 1, BS1 110 and BS2 120 can exchange signaling and/or messages via an interface 115. For example, the interface 115 may be an X2 backhaul interface supported by the wireless communication system 100. The LTE standards and/or protocols defined by 3GPP specify an X2 interface for providing signaling between eNBs. The X2 interface is used to carry signaling related to mobility management, load management, error reporting, and the like. Embodiments of the X2 interface are described in the 3GPP TS 36.423. However, other embodiments may use other types of interfaces that may include devices such as routers, switches, wired and/or wireless links, and the like to support communication between BS1 110 and BS2 120.

BS1 110 and BS2 120 may be configured to operate using a TDD frame allocation on uplink and downlink transmission, for example, one of the subframe configurations as illustrated in FIG. 2. In embodiments of the present invention, BS1 110 and BS2 120 can dynamically switch between different UL/DL configurations during operation. Moreover, BS1 110 and BS2 120 may be able to independently reconfigure their UL/DL allocations.

In the scenario 1 as shown in FIG. 3, BS1 110 schedules and receives uplink signals 111 from one or more user equipments (UEs) during a TDD subframe. During the same TDD subframe, BS2 120 schedules and transmits downlink signals 113 to a UE2 122. Thus, the uplink signals 111 from the UE1 112 would interfere with the reception of downlink signals 113 at the UE2 122, as indicated by the signal 116. Such interference (116) may be referred as UE-to-UE interference, which is caused by mismatches between the DL-UL allocations in BS1 110 and BS2 120. In this scenario 1, UE1 112 may be referred as interfering UE, and UE2 122 may be referred as interfered UE. For the purposes of exemplary and simplicity, merely one UE1 112 and one UE2 122 are shown in FIG. 3.

Figure 4:
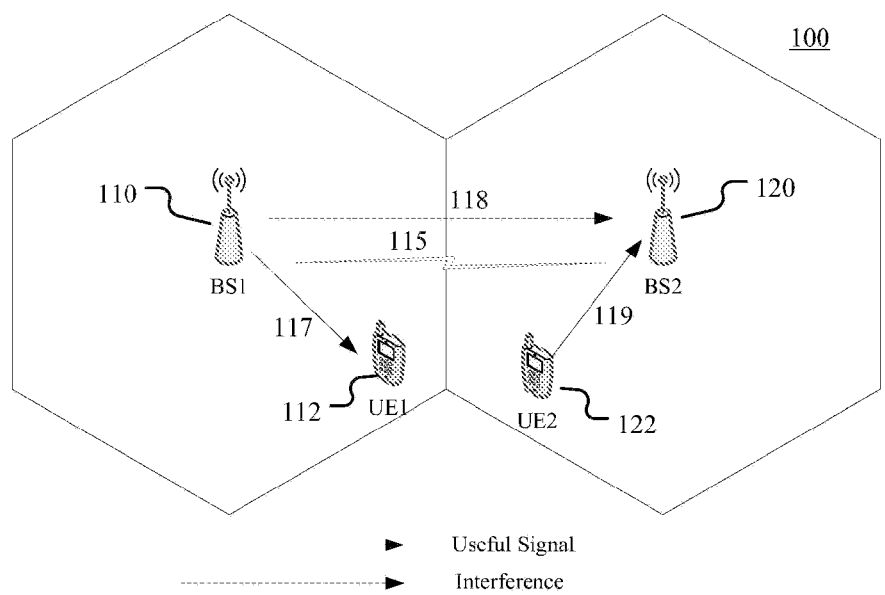
FIG. 4 illustrates an exemplary scenario 2 where the BS-to-BS interference occurs.

FIG. 4 illustrates an exemplary scenario 2 where the BS-to-BS interference occurs. In this exemplary scenario 2, BS1 110 and BS2 120 have different DL-UL allocations, such that BS1 110 schedules and transmits downlink signals 117 to the UE1 112 in a TDD subframe, and during the same TDD subframe, BS2 120 schedules and receives uplink signals 119 from the UE2 122. Thus, the downlink signals 117 from the BS1 110 would interfere with the reception of uplink signals 119 at the BS2 120, as indicated by the signal 118. Such interference may be referred as BS-to-BS interference, which is also caused by mismatches between the DL-UL allocations in BS1 110 and BS2 120. In this scenario 2, BS1 110 may be referred as interfering BS, and BS2 120 may be referred as interfered BS.

It is known that Almost Blank Subframes (ABS) may be used to avoid or mitigate conventional downlink Base-Station-to-User-Equipment (BS-to-UE) interference. ABSs are subframes with reduced power on same physical channels and/or reduced activity. Namely, interference would be reduced during ABSs.

In embodiments of the present invention, ABSs may be used to avoid or mitigate the interference of BS-to-BS and UE-to-UE. To facilitate the avoidance or mitigation of interference, the interfered BS2 120 needs to know the interference distribution being configured by the interfering BS1 110. In other words, the interfered BS2 120 should know the ABS distribution among the TDD subframes configured by the interfering BS1 110, so that it can optimize its scheduling operation and signal its affected UE(s) on subframe restricted measurement.

Therefore, embodiments of the present invention have provided a mechanism to indicate an interference distribution in TDD frame between base stations. The interference distribution may be uplink or downlink ABS distribution in the interfering base station. In this way, the recipient base station (i.e., the interfered base station) could schedule its downlink or uplink transmission based on the information about the ABS distribution.

Generally, in response to a mismatch between a first TDD frame allocation used by a first base station (e.g., the interfering BS1 110) and a second TDD frame allocation used by a second base station (e.g., the interfered BS2 120), the interfering BS1 110 may transmits a message for indicating an interference distribution in TDD frame to the interfered BS2 120. The interference distribution may be DL or UL ABS distribution being configured by the interfering BS1 110.

As illustrated in FIG. 3 and FIG. 4, the mismatch may be a mismatch between uplink subframes allocation of BS1 110 and downlink subframes allocation of BS2 120 (as the case of scenario 1), or a mismatch between downlink subframes allocation of BS1 110 and uplink subframes allocation of BS2 120 (as the case of scenario 2). For the two scenarios, different information elements (IE) may be used to indicate the interference distribution.

Figure 5:
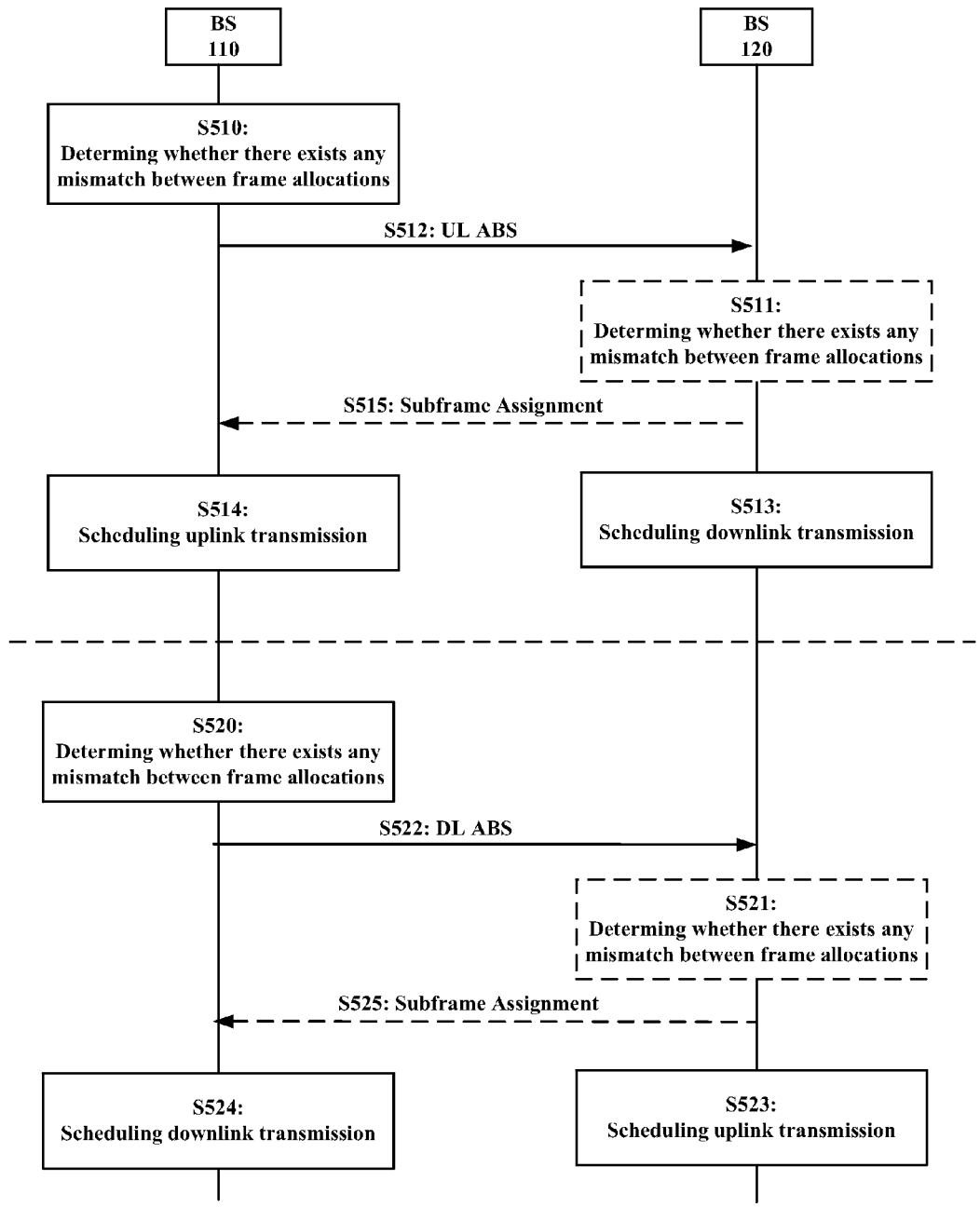
FIG. 5 illustrates exemplary signal flows according to embodiments of the present invention.

FIG. 5 illustrates exemplary signal flows according to embodiments of the present invention. The upper part of FIG. 5 illustrates the exemplary signal flow for the scenario 1, and the lower part of FIG. 5 illustrates the exemplary signal flow for the scenario 2.

As shown in upper part of FIG. 5, at step S510, BS1 110 determines whether there exists any mismatch between its own TDD frame allocation and the TDD frame allocation of its neighbour BSs (BS2 120 in this example). Normally, BS could know the TDD frame configuration of other BS (e.g., its neighbour BS). For example, BSs may communicate with each other via the interface 115 (as shown in FIG. 3). A TDD Subframe Assignment IE may be used to exchange their respective TDD subframe allocation, i.e., UL-DL subframe configuration information. The exchange of information may be performed periodically or by request. The skilled in the art should appreciate that other interfaces or other IEs may be used to acquire the TDD subframe configuration information, Thus, the determination may be based on the acquired TDD subframe configuration information.

For scenario 1, if a mismatch exists and the mismatch is between the uplink subframes allocation of BS1 110 and downlink subframes allocation of BS2 120, then at the step S512, the BS1 110 would transmit to the BS2 120 a message for indicating UL ABS pattern being configured by the BS1 110. The BS1 110 would "blank" its uplink subframes according to the UL ABS pattern for the benefit of the interfered BS2 120.

In current technical specifications, no message has been defined for the UL ABS. Thus, a new information element (m) is introduced for the UL ABS and therefore the new IE may be referred as UL ABS IE. This new 1E provides information about which uplink subframes the sending eNB (i.e., the interfering BS) is configuring as Almost Blank Subframes. Moreover, this IE further provides information about which subset of uplink ABSs are recommended for configuring measurements towards the UE. An exemplary structure of the UL ABS information element is shown in Table 1.

TABLE 1

| IE/Group Name | Presence | Range | IE type and reference | Semantics description |
| --- | --- | --- | --- | --- |
| CHOICE ABS Information | M | — | — | — |
| >TDD | | | — | — |
| >>UL ABS Pattern Info | M | | BIT STRING (1 . . . 70, . . . ) | Each position in the bitmap represents an UL subframe for which value "1" indicates 'ABS' and value "0" indicates 'non ABS'. The maximum number of subframes depends on UL/DL subframe configuration. The maximum number of subframes is 20 for UL/DL subframe configuration 1-5; 60 for UL/DL subframe configuration 6; 70 for UL/DL subframe configuration 0. UL/DL subframe configuration defined in TS 36.211. The first position of the ABS pattern corresponds to subframe 0 in a radio frame where SFN = 0. The ABS pattern is continuously repeated in all radio frames, and restarted each time SFN = 0. |

TABLE 1-continued

| IE/Group Name | Presence | Range | IE type and reference | Semantics description |
|---|---|---|---|---|
| >>Measurement Subset | M | | BIT STRING (1 ... 70, ...) | Indicates a subset of the ABS Pattern Info above, and is used to configure specific measurements towards the UE |
| >ABS Inactive | M | | NULL | Indicates that interference coordination by means of almost blank subframes is not active |

As shown in Table 1, the UL ABS information element comprises a field of UL ABS pattern information, which indicates which UL subframes the sending eNB (the interfering BS1 110 in this example) is configuring as ABSs. The periodicities of the UL ABS could be of 20 ms for Configuration 1-5 (as shown in FIG. 2), 70 ms for Configuration 0 and 60 ms for Configuration 6. Alternatively, UL ABS with 10 ms periodicity may also be used to adapt to traffic quicker. The UL ABS information element further comprises a field of Measurement Subset, which indicates which subset of UL ABSs are recommended for configuring measurements towards the UE, such that the UE may perform subframe restricted measurement. The UL ABS information element may further comprises a field of ABS Inactive, which indicates whether that interference coordination by means of ABSs is active.

Having informed the interfered BS2 120 of the UL ABS information, the interfering BS1 110 would "blank" its uplink subframes according to the UL ABS pattern for the benefit of the interfered BS2 120. As shown in FIG. 5, at step S514, the BS1 110 schedules uplink transmission of its interfering UE(s) according to the UL ABS information. Normally, a UE on the edge of its serving cell (called as edge UE) would transmit with higher power than a UE at the center of the serving cell (called as center UE), and thus the edge UE might interfere with other edge UEs within neighbour cells. Therefore, the BS1 110 could schedule some or all of its edge UEs (i.e., its interfering UEs) to blank their uplink transmission according to the UL ABS information.

Upon received the UL ABS information, the recipient BS2 120 (i.e., the interfered BS) could optimize its scheduling operation. For example, at step S513, the BS2 120 can schedule its downlink transmission according to the received UL ABS information. In one embodiment, the BS2 120 can instruct its interfered UE(s) to perform measurements during the ABS, i.e., subframe restricted measurements.

For scenario 2, as shown in the lower part of FIG. 5, at step S520, BS1 110 determines whether there exists any mismatch between its own TDD frame allocation and the TDD frame allocation of its neighbour BSs (BS2 120 in this example).

If a mismatch exists and the mismatch is between the downlink subframes allocation of BS1 110 and uplink subframes allocation of BS2 120, then at the step S522, the BS1 110 would transmit to the BS2 120 a message for indicating DL ABS pattern being configured by the BS1 110. The BS1 110 would "blank" its downlink subframes according to the DL ABS pattern for the benefit of the interfered BS2 120.

In current technical specifications, a DL ABS information element has been defined in Release 10 for the conventional BS-to-UE interference. In BS-to-UE interference scenario, both BS1 110 and BS2 120 schedule and transmit signals to their respective UE (e.g., UE1 112 and UE2 122) during a same TDD subframe, and therefore the downlink transmission from the BS1 110 would interfere with the reception of downlink transmission from the BS2 120 at the UE2 122. Such interference may be called as co-channel interference. For mitigating the interference, the BS1 110 could "blank" its downlink transmission, so as to protect the downlink transmission of the BS2 120.

For the scenario 2 as described in the present invention, the existing DL ABS information element may be reused to indicate the DL ABS being configured by the BS1 110 but for protecting the uplink transmission of the BS2 120. The DL ABS information element can provide information about which downlink subframes the sending eNB (i.e., the interfering BS1 110) is configuring as Almost Blank Subframes. Further, for differentiating from the existing DL ABS information in Release 10, an optional filed of UL ABS flag is included to indicate whether the DL ABS is used to protect UL transmission or DL transmission in the recipient BS. An exemplary structure of the DL ABS information element is shown in Table 2.

TABLE 2

| IE/Group Name | Presence | Range | IE type and reference | Semantics description |
|---|---|---|---|---|
| CHOICE ABS Information | M | | — | — |
| >TDD | | | — | — |
| >>DL ABS Pattern Info | M | | BIT STRING (1 ... 70, ...) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1-5; 60 for UL/DL subframe configuration 6; 70 for UL/DL |

TABLE 2-continued

| IE/Group Name | Presence | Range | IE type and reference | Semantics description |
|---|---|---|---|---|
| | | | | subframe configuration 0. UL/DL subframe configuration defined in TS 36.211. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) defined in TS 36.211 |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |
| >UL ABS Flag | O | | BOOLEAN: TRUE or FALSE | True is set when the DL ABS is used to protect UL transmission in the recipient eNB. |

As shown in Table 2, the DL ABS information element comprises a field of DL ABS pattern information, which indicates which DL subframes the sending eNB (the interfering BS1 110 in this example) is configuring as ABSs. The periodicities of the DL ABS could be of 20 ms for Configuration 1-5 (as shown in FIG. 2), 70 ms for Configuration 0 and 60 ms for Configuration 6. Alternatively, the DL ABS with smaller periodicity (e.g., 10 ms) may also be used to adapt to traffic quicker. The DL ABS information element further comprises a field of Number Of Cell-specific Antenna Ports, a field of Measurement Subset, and a field of ABS Inactive. Moreover, the DL ABS information element further comprises an optional field of UL ABS flag, which is used to differentiate from the Release-10 DL ABS information element. In other words, if the UL ABS flag is set as "True", then it indicates that the DL ABS is used to protect UL transmission in the recipient eNB (i.e., the interfered BS2 120), but not to protect DL transmission in the BS2 120 as defined by the existing DL ABS information element.

Having informed the interfered BS2 120 of the DL ABS information, the interfering BS1 110 would "blank" its downlink subframes according to the DL ABS pattern for the benefit of the interfered BS2 120. As shown in FIG. 5, at step S524, the BS1 110 schedules downlink transmission to its UE(s) according to the DL ABS information.

Upon received the DL ABS information, the recipient BS2 120 (i.e., the interfered BS) could optimize its scheduling operation. Unlike the case in Release-10 where the recipient BS restricts its DL scheduling, at step S523, the BS2 120 can schedule its uplink transmission according to the received DL ABS information. In one embodiment, the BS2 120 can instruct its interfered UE(s) to perform uplink transmission only in these DL ABS and to avoid uplink transmission in non-DL ABS.

In further embodiments, for either the scenario 1 or the scenario 2, upon received either the UL ABS information or the DL ABS information with a flag, the BS2 120 could further perform the step (S511, S521) of determining whether the TDD frame allocation of BS1 110 and the TDD frame allocation of BS2 120 are the same, because such information element (i.e., the UL ABS or the DL ABS with a flag) implies a mismatch exists between the TDD frame allocation of BS1 110 and the TDD frame allocation of BS2 120.

If no (i.e., the two allocations are different), the BS2 120 may schedule its UL or DL transmission according to the received UL ABS or DL ABS, for example as described with respect to the steps of S513 and S523.

If yes (i.e., the two allocations are identical), then at the step S515 or S525 in FIG. 5, the BS2 120 may inform this to the BS1. In one embodiment, the BS2 may request the TDD frame allocation of the BS1 110 from the BS1 110, because the reception of the UL ABS or DL ABS with a flag may imply that the TDD frame allocation of BS1 110 has changed. In another embodiment, the BS2 may inform its own TDD frame allocation to the BS1 110, because the current TDD frame allocation of BS2 120 may have changed and have not informed to BS1 110. In this way, the BS1 or BS2 can assure whether there exists any mismatch between their TDD frame allocations.

Upon confirmed the mismatch, the BS1 110 and BS2 120 can schedule their respective UL or DL transmission according to the UL or DL ABS pattern information, and thus the UE-to-UE or BS-to-BS interference may be reduced or mitigated.

Figure 6:
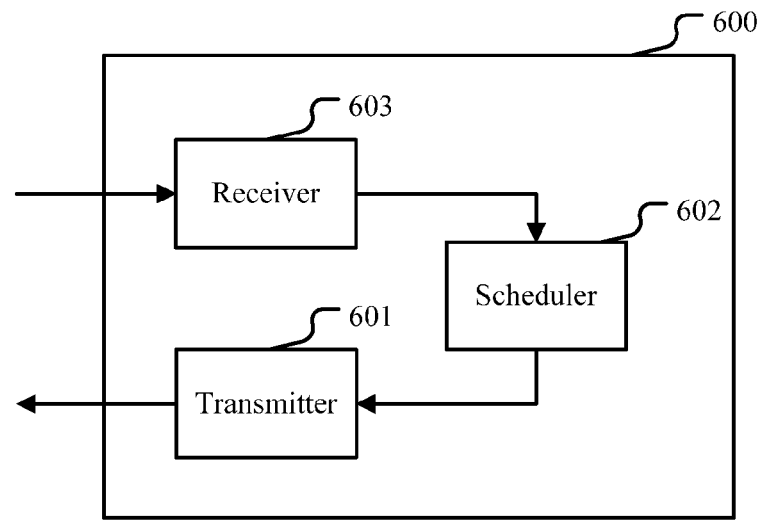
FIG. 6 is a schematic block diagram of an apparatus that may be configured to practice the exemplary embodiments of the present invention.

FIG. 6 is a schematic block diagram of an apparatus that may be configured to practice the exemplary embodiments of the present invention.

As shown in FIG. 6, the apparatus 600 may comprise a transmitter 601, a scheduler 602, and a receiver 603.

In one aspect, the apparatus 600 may be incorporated in the BS1 110 and be configured to perform methods of the exemplary embodiments of the present invention.

The transmitter 601 may be configured to, in response to a mismatch between a first TDD frame allocation used by a first base station (e.g., BS1 110) and a second TDD frame allocation used by a second base station (e.g., BS2 120), transmit, from the first base station to the second base station, a message for indicating an interference distribution in TDD frame. The interference distribution may be ABS (UL ABS or DL ABS) distribution being configured by the BS1 110.

In one embodiment, if the mismatch is between uplink subframes of the first TDD frame allocation and downlink subframes of the second TDD frame allocation, the message includes UL ABS information. The message may be structured as previously described with Table 1. Then, the scheduler 602 may be configured to schedule uplink transmission of the BS1's interfering UE(s) according to the UL ABS information.

In another embodiment, if the mismatch is between downlink subframes of the first TDD frame allocation and uplink subframes of the second TDD frame allocation, the message includes DL ABS information. The message may be structured as previously described with Table 2. Then, the scheduler 602 may be configured to schedule downlink transmission to its UE(s) according to the DL ABS information.

The receiver 603 may be configured to receive any message from other network devices, e.g., base stations. For example, the receiver 603 may be configured to receive a request from the BS2 120 of the TDD frame allocation of the BS1 110. For another example, the receiver 603 may be configured to receive from the BS2 120 the TDD frame allocation of the BS2. The information may be carried by a TDD Subframe Assignment information element.

In another aspect, the apparatus 600 may be incorporated in the BS2 120 and be configured to perform methods of the exemplary embodiments of the present invention.

The receiver 603 may be configured to receive from a first base station (e.g., BS1 110), a message for indicating an interference distribution in TDD frame, wherein the message implies a mismatch between a first TDD frame allocation used by the first base station (e.g., BS1 110) and a second TDD frame allocation used by the second base station (e.g., BS2 120). The interference distribution may be ABS (UL ABS or DL ABS) distribution being configured by the BS1 110.

The scheduler 602 may be configured to schedule its UL or DL transmission according to the received message.

In one embodiment, if the message includes UL ABS information, the scheduler 602 may be configured to schedule downlink transmission according to the UL ABS information.

In another embodiment, if the message includes DL ABS information and a flag to indicate that the DL ABS is used to protect the uplink transmission in the recipient base station, the scheduler 602 may be configured to schedule uplink transmission according to the DL ABS information.

The transmitter 601 may be configured to transmit any message to other network devices, e.g., base stations. For example, if BS2 120 determines that the first TDD frame allocation and the second TDD frame allocation are the same, then the transmitter 601 may be configured to transmit a request for the first TDD frame allocation to the first base station (BS1 110) or inform the second TDD frame allocation to the first base station (BS1 110).

Figure 7:
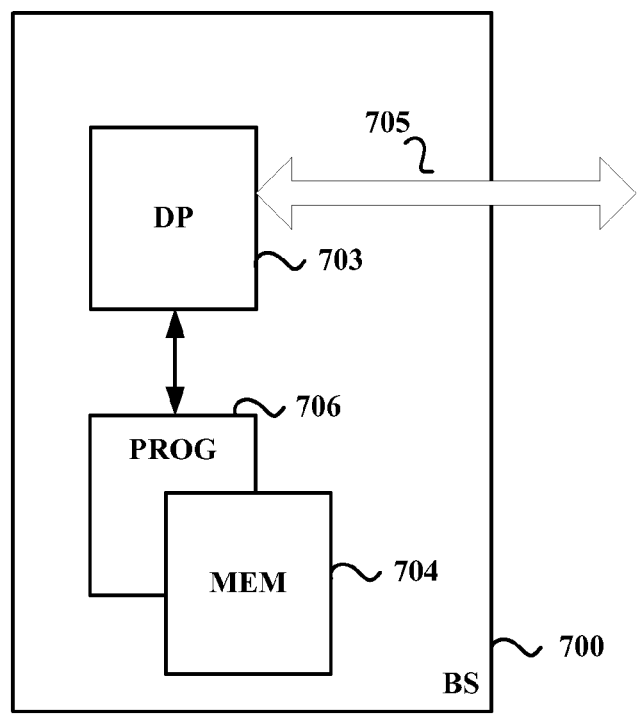
FIG. 7 illustrates a simplified block diagram of a BS that are suitable for use in practicing the exemplary embodiments of the present invention.

FIG. 7 illustrates a simplified block diagram of a BS 700 that is suitable for use in practicing the exemplary embodiments of the present invention. As shown in FIG. 7, the BS 700 includes a data processor (DP) 703, a memory (MEM) 704 coupled to the DP 703, and a communication interface 705 coupled to the DP 703. The MEM 704 stores a program (PROG) 706. The communication interface 705 may be X2 interface for bidirectional communications with other BSs.

In some embodiments, the program (PROG) 706 may be configured, together with the DP 703, to cause the BS 700 to act as the interfering BS1 110 and operate in accordance with the exemplary embodiments of the invention. In other embodiments, the program (PROG) 706 may be configured, together with the DP 703, to cause the BS 700 to act as the interfered BS2 120 and operate in accordance with the exemplary embodiments of the invention.

The embodiments of the present invention may be implemented by computer software executable by the DP 703 of the BS 700, or by hardware, or by a combination of software and hardware.

Although embodiments of the present invention have been set forth with respect to TDD systems, but the signaling mechanism as proposed in the present invention may also be used to other systems where UE-to-UE or BS-to-BS interference may occur, regardless the being developed system or the future systems. The present invention has no limitation in this regard.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method, comprising:
   receiving, by a first base station from a second base station, a second frame allocation used by the second base station;
   in response to a mismatch between downlink subframes of a first frame allocation used by the first base station and uplink subframes of the second frame allocation used by the second base station, the first base station:
   configuring an Almost Blank Subframe distribution indicating a downlink Almost Blank Subframe pattern; and
   transmitting, to the second base station, a message including the Almost Blank Subframe distribution, wherein the message further comprises a flag to indicate that the downlink Almost Blank Subframe pattern is used to protect uplink transmission in the second base station.

2. The method of claim 1, further comprising transmitting, by the first base station to the second base station, a message, including uplink Almost Blank Subframe information, responsive to a mismatch being between uplink subframes of the first frame allocation and downlink subframes of the second frame allocation.

3. The method of claim 2, further comprising:
   the first base station scheduling uplink transmission of its interfering user equipment according to the uplink Almost Blank Subframe information.

4. A method, comprising:
   transmitting, from a second base station to a first base station, a second frame allocation used by the second base station;
   receiving, from the first base station at the second base station, a message including a flag and an Almost Blank Subframe distribution indicating a downlink Almost Blank Subframe pattern, wherein the message implies a mismatch between a first frame allocation used by the first base station and the second frame allocation used by the second base station;
   the Almost Blank Subframe distribution being configured by the first base station; and
   scheduling, by the second base station, uplink transmission according to the downlink Almost Blank Subframe pattern and the flag included in the message, wherein the flag indicates that the downlink Almost Blank Subframe pattern is used to protect the uplink transmission in the second base station.

5. The method of claim 4, further comprising:
   scheduling, by the second base station, downlink transmission according to uplink Almost Blank Subframe information included in the message.

6. The method of claim 4, wherein if the second base station determines that the first frame allocation and the second frame allocation are the same, the second base station requests the first frame allocation from the first base station or informs the second frame allocation to the first base station.

7. An apparatus, comprising:
   a receiver configured to receive, at a first base station from a second base station, a second frame allocation used by the second base station;
   a transmitter configured to, in response to a mismatch between downlink subframes of a first frame allocation used by the first base station and uplink subframes of the second frame allocation used by the second base station, be operable to:
   configure an Almost Blank Subframe distribution indicating a downlink Almost Blank Subframe pattern; and
   transmit, to the second base station, a message including the Almost Blank Subframe distribution, wherein the message further comprises a flag to indicate that the downlink Almost Blank Subframe pattern is used to protect uplink transmission in the second base station.

8. The apparatus of claim 7, wherein the message further includes uplink Almost Blank Subframe information responsive to a mismatch being between uplink subframes of the first frame allocation and downlink subframes of the second frame allocation.

9. The apparatus of claim 8, further comprising:
   a scheduler configured to schedule, at the first base station, uplink transmission of its interfering user equipment according to the uplink Almost Blank Subframe information.

10. An apparatus, comprising:
    a transmitter configured to transmit, from a second base station to a first base station, a second frame allocation used by the second base station;
    a receiver configured to receive, from the first base station at the second base station, a message including a flag and an Almost Blank Subframe distribution indicating a downlink Almost Blank Subframe pattern, wherein the message implies a mismatch between a first frame allocation used by the first base station and the second frame allocation used by the second base station;
    the Almost Blank Subframe distribution being configured by the first base station; and
    a scheduler configured to schedule, at the second base station, uplink transmission according to the downlink Almost Blank Subframe pattern and the flag included in the message, wherein the flag indicates that the downlink Almost Blank Subframe pattern is used to protect the uplink transmission in the second base station.

11. The apparatus of claim 10, wherein the scheduler is further configured to schedule, at the second base station, downlink transmission according to uplink Almost Blank Subframe information included in the message.

12. The apparatus of claim 10, further comprising:
    a transmitter configured to transmit a request for the first frame allocation to the first base station or inform the second frame allocation to the first base station, if the second base station determines that the first frame allocation and the second frame allocation are the same.

* * * * *